US011830478B2

(12) United States Patent
Ohishi et al.

(10) Patent No.: US 11,830,478 B2
(45) Date of Patent: Nov. 28, 2023

(54) LEARNING DEVICE, LEARNING METHOD, AND LEARNING PROGRAM FOR IMAGES AND SOUND WHICH USES A SIMILARITY MATRIX

(71) Applicants: NIPPON TELEGRAPH AND TELEPHONE CORPORATION, Tokyo (JP); Massachusetts Institute of Technology, Cambridge, MA (US)

(72) Inventors: Yasunori Ohishi, Musashino (JP); Akisato Kimura, Musashino (JP); Takahito Kawanishi, Musashino (JP); Kunio Kashino, Musashino (JP); James R. Glass, Winchester, MA (US); David Harwath, Boston, MA (US)

(73) Assignees: NIPPON TELEGRAPH AND TELEPHONE CORPORATION, Tokyo (JP); MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 364 days.

(21) Appl. No.: 17/219,893

(22) Filed: Apr. 1, 2021

(65) Prior Publication Data

US 2022/0319495 A1 Oct. 6, 2022

(51) Int. Cl.
*G10L 15/06* (2013.01)
*G10L 25/54* (2013.01)
(Continued)

(52) U.S. Cl.
CPC ............ *G10L 15/063* (2013.01); *G06N 20/00* (2019.01); *G10L 15/16* (2013.01); *G10L 25/54* (2013.01)

(58) Field of Classification Search
CPC ....... G10L 15/063; G10L 15/16; G10L 25/54; G06N 20/00
See application file for complete search history.

(56) References Cited

U.S. PATENT DOCUMENTS 8,538,957 B1 * 9/2013 Zhou ........................ G06F 40/51 707/760
2015/0036930 A1 * 2/2015 Oishi .................. G06V 10/758 382/190
(Continued)

OTHER PUBLICATIONS

Kádár, Ákos, et al. "Bootstrapping disjoint datasets for multilingual multimodal representation learning." arXiv preprint arXiv: 1911.03678 (2019). (Year: 2019).*
(Continued)

*Primary Examiner* — Bhavesh M Mehta
*Assistant Examiner* — Nandini Subramani
(74) *Attorney, Agent, or Firm* — XSENSUS LLP

(57) ABSTRACT

A learning device calculates a feature of each data included in a pair of datasets in which two modalities among a plurality of modalities are combined, using a model that receives data on a corresponding modality among the modalities and outputs a feature obtained by mapping the received data into an embedding space. The learning device then selects similar data similar to each target data that is data on a first modality in a first dataset of the datasets, from data on a second modality included in a second dataset of the datasets. The learning device further updates a parameter of the model such that the features of the data in the pair included in the first and the second datasets are similar to one another, and the feature of data paired with the target data is similar to the feature of data paired with the similar data.

6 Claims, 12 Drawing Sheets

(51) Int. Cl.

| | |
|---|---|
| ***G10L 15/16*** | (2006.01) |
| ***G06N 20/00*** | (2019.01) |

(56) References Cited

U.S. PATENT DOCUMENTS

| | | | | |
|---|---|---|---|---|
| 2018/0039859 A1* | 2/2018 | Harwath | ................ | G06V 20/35 |
| 2020/0089755 A1* | 3/2020 | Shazeer | ................ | G06F 40/284 |
| 2022/0138439 A1* | 5/2022 | Tambi | ................... | G06F 40/117 704/2 |
| 2022/0147743 A1* | 5/2022 | Roy | ....................... | G06V 10/82 |

OTHER PUBLICATIONS

Havard, William N. et. al. "Models of visually grounded speech signal pay attention to nouns: A bilingual experiment on english and japanese." ICASSP 2019-2019 IEEE International Conference on Acoustics, Speech and Signal Processing (ICASSP). IEEE, 2019 (Year: 2019).*

Harwath et al., "Jointly Discovering Visual Objects and Spoken Words from Raw Sensory Input", International Journal of Computer Vision, vol. 128 (2020), Available Online at: https://doi.org/10.1007/s11263-019-01205-0, Aug. 5, 2019, pp. 620-641.

Harwath et al., "Vision as an Interlingua: Learning Multilingual Semantic Embeddings of Untranscribed Speech", Proc. ICASSP, Apr. 9, 2018, 5 pages.

Ohishi et al., "Trilingual Semantic Embeddings of Visually Grounded Speech with Self-Attention Mechanisms", Proc. ICASSP, 2020, 5 pages.

Exception to Lack of Novelty of Invention dated Apr. 16, 2021 filed in Japanese Patent Application No. 2021-066028, 3 pages.

INTERSPEECH 2020, INTERSPEECH, Shanghai International Convention Center, Shanghai, China, Oct. 25-29, 2020, http://interspeech2020.org/, 8 pages.

Technical Program—INTERSPEECH 2020, http://www.interspeech2020.org/Program/Technical_Program/, Oct. 27, 2020, 1 page.

Yasunori Ohishi, et al., "Pair Expansion for Learning Multilingual Semantic Embeddings using Disjoint Visually-grounded Speech Audio Datasets", INTERSPEECH 2020, Shanghai, China, Oct. 25-29, 2020, 5 page.

* cited by examiner

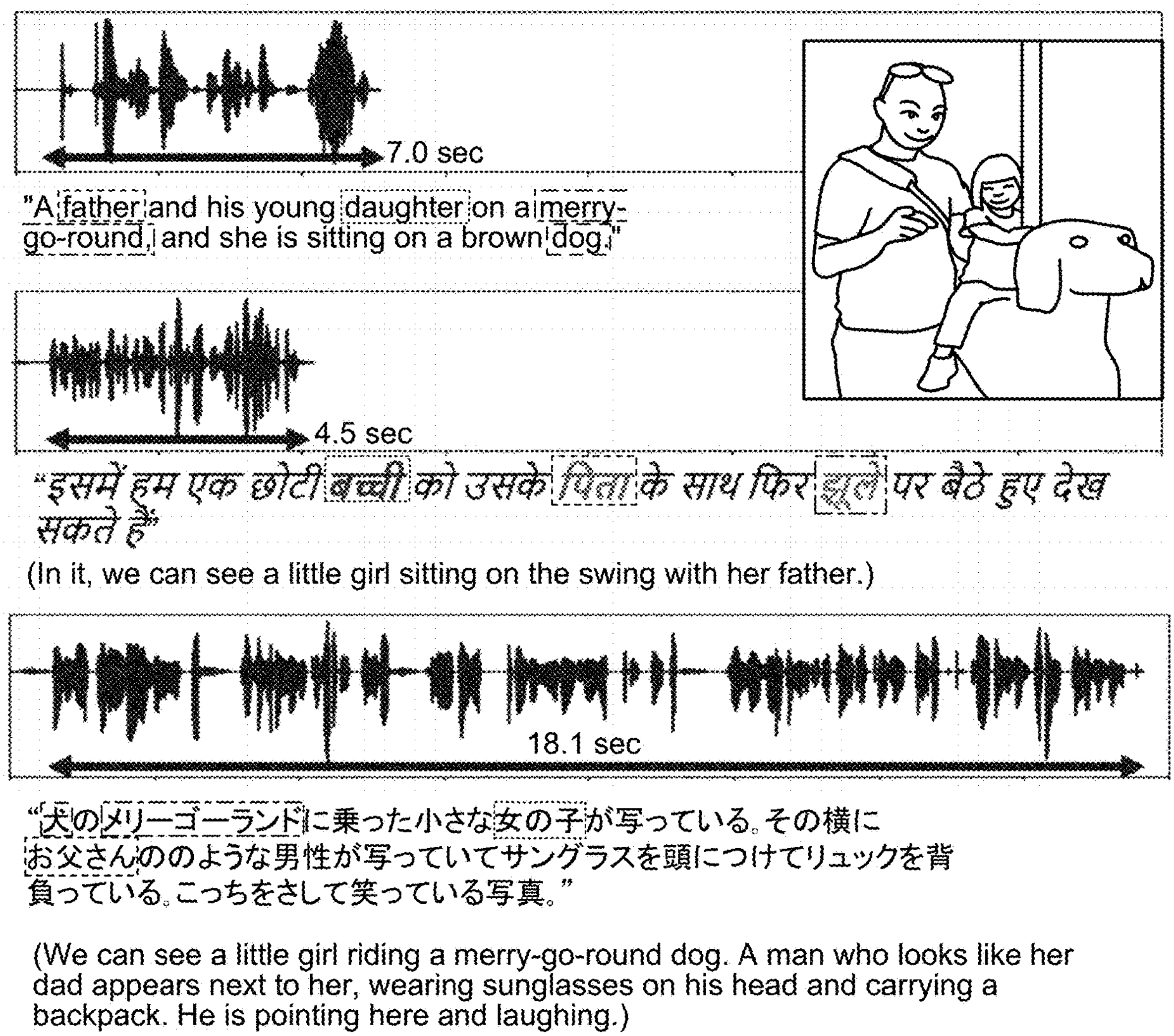

FIG.2

"A father and his young daughter on a merry-go-round, and she is sitting on a brown dog."

"इसमें हम एक छोटी बच्ची को उसके पिता के साथ फिर झूले पर बैठे हुए देख सकते हैं"

(In it, we can see a little girl sitting on the swing with her father.)

"犬のメリーゴーランドに乗った小さな女の子が写っている。その横にお父さんののような男性が写っていてサングラスを頭につけてリュックを背負っている。こっちをさして笑っている写真。"

(We can see a little girl riding a merry-go-round dog. A man who looks like her dad appears next to her, wearing sunglasses on his head and carrying a backpack. He is pointing here and laughing.)

FIG.9

| | I→E | E→I | I→J | J→I | J→E | E→J |
|---|---|---|---|---|---|---|
| Baseline | | | | | | |
| R@10 | .402 | .433 | .576 | .607 | .107 | .080 |
| R@5 | .306 | .330 | .422 | .485 | .074 | .055 |
| R@1 | .109 | .116 | .149 | .182 | .026 | .019 |
| VGG16 ($N=10^2$) | | | | | | |
| R@10 | .415 | .431 | .553 | .627 | .142 | .138 |
| R@5 | .296 | .316 | .432 | .489 | .087 | .084 |
| R@1 | .105 | .120 | .150 | .187 | .023 | .023 |
| Embedding ($N=10^2$) | | | | | | |
| R@10 | .425 | .438 | .578 | .617 | .170 | .189 |
| R@5 | **.310** | .330 | .423 | .485 | .109 | .117 |
| R@1 | .103 | .127 | .154 | .180 | .031 | .039 |
| Embedding ($N=10^3$) | | | | | | |
| R@10 | .405 | .440 | **.582** | **.629** | .203 | .216 |
| R@5 | .299 | .324 | .425 | **.489** | **.122** | .136 |
| R@1 | .101 | .119 | **.158** | **.190** | .031 | .039 |
| Embedding ($N=10^4$) | | | | | | |
| R@10 | **.410** | **.442** | .574 | **.620** | **.211** | **.233** |
| R@5 | .298 | **.340** | **.433** | **.487** | **.121** | **.144** |
| R@1 | **.111** | **.126** | **.156** | .182 | **.035** | **.047** |

FIG.11

| | I→E | E→I | I→H | H→I | H→E | E→H |
|---|---|---|---|---|---|---|
| Baseline | | | | | | |
| R@10 | .361 | .397 | .348 | .370 | .079 | .069 |
| R@5 | .249 | .270 | .246 | .279 | .040 | .048 |
| R@1 | .084 | .080 | .071 | .085 | .007 | .016 |
| VGG16 ($N=10^2$) | | | | | | |
| R@10 | .389 | .425 | .354 | .389 | .090 | .108 |
| R@5 | .287 | .315 | .278 | .283 | .056 | .059 |
| R@1 | .095 | .113 | .094 | .096 | .013 | .014 |
| Embedding ($N=10^2$) | | | | | | |
| R@10 | .412 | .425 | .376 | .390 | .125 | .132 |
| R@5 | .284 | .310 | **.281** | .282 | .078 | .078 |
| R@1 | .100 | .114 | .087 | .102 | .019 | .021 |
| Embedding ($N=10^3$) | | | | | | |
| R@10 | .407 | .424 | **.368** | .391 | **.140** | .148 |
| R@5 | .284 | .315 | .271 | .285 | .084 | .089 |
| R@1 | .096 | .110 | .093 | **.105** | .017 | .025 |
| Embedding ($N=10^4$) | | | | | | |
| R@10 | **.414** | **.430** | **.368** | **.414** | .139 | **.156** |
| R@5 | **.299** | **.321** | .266 | **.286** | **.092** | **.091** |
| R@1 | **.101** | **.121** | **.102** | .093 | **.026** | **.029** |

LEARNING DEVICE, LEARNING METHOD, AND LEARNING PROGRAM FOR IMAGES AND SOUND WHICH USES A SIMILARITY MATRIX

FIELD

The present invention relates to a learning device, a learning method, and a learning program.

BACKGROUND

Image recognition technologies enable identification of a variety of objects displayed in an image. Furthermore, technologies are known that associate linguistic information with visual information by labeling images.

For example, a technology is known in which a large number of pieces of paired data of images and speeches (hereinafter, called an audio caption) for describing the content of the images are prepared, and an area of an image is associated with a segment of a speech (hereinafter, called an audio segment) (refer, for example, to Non Patent Literature 1: David Harwath, Adria Recasens, Didac Suris, Galen Chuang, Antonio Torralba, and James Glass, "Jointly Discovering Visual Objects and Spoken Words from Raw Sensory Input," International Journal of Computer Vision (2019) (https://doi.org/10.1007/s11263-019-01205-0)).

Another technology is known in which translation knowledge between languages is obtained by preparing multilingual audio captions for explaining an image (refer, for example, to Non Patent Literature 2: D. Harwath, G. Chuang, and J. Glass, "Vision as an interlingua: Learning multilingual semantic embeddings of untranscribed speech," in Proc. ICASSP, 2018.).

Furthermore, a technology is known in which cross-modal data retrieval is implemented by mapping an image and the corresponding audio caption into a common embedding space (refer, for example, to Non Patent Literature 3: Yasunori Ohishi, Akisato Kimura, Takahito Kawanishi, Kunio Kashino, David Harwath, James Glass, "Trilingual Semantic Embeddings of Visually Grounded Speech with Self-Attention Mechanisms," in Proc. ICASSP, 2020.).

The conventional technologies, however, have a problem in that the accuracy of a model for cross-modal data retrieval sometimes does not improve, if there is not enough data associated with information on different modalities.

The modality (modal, mode, form) may also be referred to as a way of expressing ideas. For example, for the concept of a dog, an "image" in which a dog is photographed, "speech" of speaking out the word "dog", and a "text" of the word "dog" in various forms such as "dog", "Dog", "DOG" correspond to the modalities. Examples of modalities include an image, speech, video, predetermined sensing data, and the like.

For example, retrieval of an image using the speech in a certain language as a query (cross-modal retrieval) or retrieval of speech in different languages (cross-lingual retrieval) is to be performed using the technology described in Non Patent Literature 3. In this case, to train the model for retrieval, it is preferable to prepare audio captions in a plurality of languages for the same image. However, it may be difficult to implement the technology because the cost of collecting such data is extremely high.

SUMMARY

According to an aspect of the embodiments, a learning device comprising: a memory; and a processor coupled to the memory and programmed to execute a process comprising: calculating a feature of each data included in a pair of datasets in which two modalities among a plurality of modalities are combined, using a model that receives data on a corresponding modality among the modalities and outputs a feature obtained by mapping the received data into an embedding space;

selecting similar data similar to each target data that is data on a first modality in a first dataset of the datasets, from data on a second modality included in a second dataset of the datasets; and updating a parameter of the model such that the features of the data in the pair included in the first and the second datasets are similar to one another, and the feature of data paired with the target data is similar to the feature of data paired with the similar data.

The present invention is capable of improving the accuracy of a model for cross-modal data retrieval, even if there is not enough data associated with information on different modalities.

BRIEF DESCRIPTION OF DRAWINGS

FIG. 2 is an explanatory diagram explaining audio captions.

FIG. 9 is a chart illustrating experimental results.

FIG. 11 is a chart illustrating experimental results.

BEST MODES OF CARRYING OUT THE INVENTION

The following describes embodiments of a learning device, a learning method, and a learning program according to the present application in detail based on the drawings. The present invention is not limited to the embodiments described below.

First Embodiment

A learning device according to a first embodiment of the present invention uses received learning data to train an image encoder and an audio encoder. The learning device outputs the encoders after being trained. For example, the learning device outputs parameters of the encoders. The learning device may train audio encoders corresponding to a plurality of languages. The learning data is data including images and speeches associated with the images.

The image encoder is a model that receives an image and outputs an image feature. The audio encoder is a model that receives a speech in a predetermined language and outputs an audio feature. The learning device optimizes the image encoder and the audio encoder based on the image feature and the audio feature output therefrom.

Configuration of First Embodiment

Figure 1:
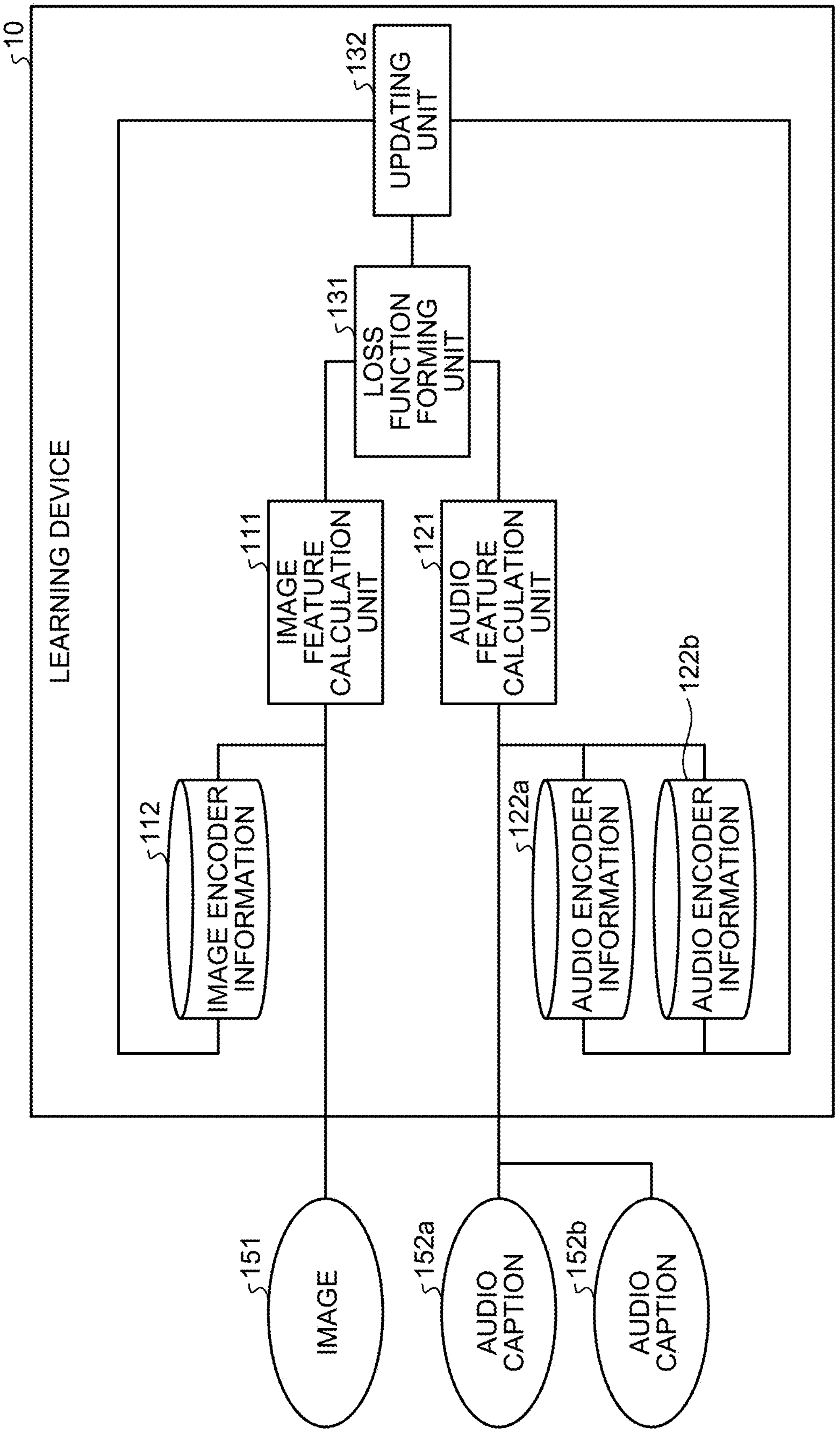
FIG. 1 is a diagram illustrating a configuration example of a learning device according to a first embodiment.

FIG. 1 is a diagram illustrating a configuration example of a learning device according to the first embodiment. As illustrated in FIG. 1, a learning device 10 includes an image feature calculation unit 111, an audio feature calculation unit 121, a loss function forming unit 131, and an updating unit 132. The learning device 10 stores image encoder information 112, audio encoder information 122*a*, and audio encoder information 122*b*.

The learning device 10 receives an image 151, an audio caption 152*a*, and an audio caption 152*b*. The learning device 10 can output the image encoder information 112, the audio encoder information 122*a*, and the audio encoder information 122*b* that have been updated.

The audio caption is a speech corresponding to the image. For example, the audio caption is represented by a signal obtained by recording a speech spoken for explaining the content of the image by a person who has viewed the image. The audio caption may be obtained, for example, using crowdsourcing to show the image to speakers of the respective languages and record speeches spoken by the speakers for explaining the image.

FIG. 2 is an explanatory diagram explaining the audio captions. FIG. 2 illustrates the audio captions in different languages. FIG. 2 illustrates examples of audio captions in English, Hindi, and Japanese.

A text in each of the languages corresponding to the audio caption in FIG. 2 is displayed merely for explanation, and is not included in the audio caption. A text obtained by translating the Hindi text into English is illustrated under the text in Hindi. A text obtained by translating the Japanese text into English is illustrated under the text in Japanese.

In the example of FIG. 2, the speakers of the respective languages view the same image. In other words, the speakers of the respective languages view an image displaying two people and a merry-go-round. However, the contents and durations of the obtained audio captions vary from one another. In other words, a plurality of audio captions in different languages do not necessarily have a relation of parallel translation to one another. This is caused by, for example, differences in culture and vocabulary among the languages.

To collect the audio captions in a plurality of languages for the same image, as illustrated in FIG. 2, for example, additional efforts are required such as presenting an image to the speakers of different languages and asking the speakers to describe the image in speech.

However, it is possible to easily collect the audio caption in one language for one image, compared to the audio captions in different languages. For example, paired data of images and speeches may be automatically collected using video distribution services or the like.

Therefore, an object of the present embodiment is to improve the accuracy of the model, even if there is not enough data in which the audio captions in a plurality of different languages are associated with one image.

Figure 3:
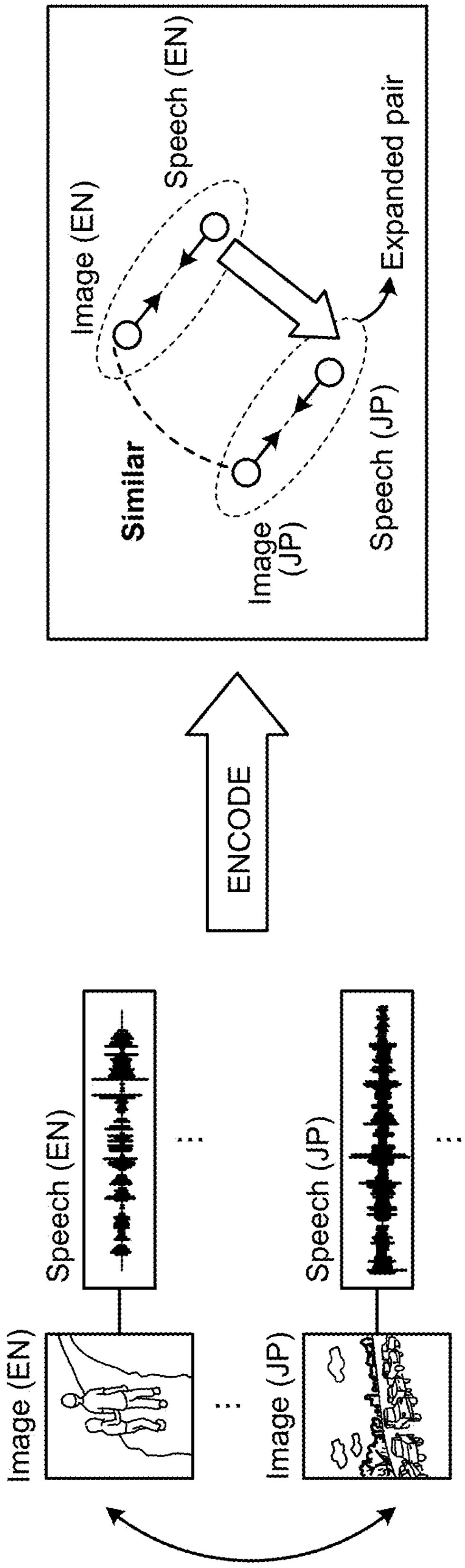
FIG. 3 is an explanatory diagram explaining processing of the learning device.

FIG. 3 is an explanatory diagram explaining processing of the learning device. Image (EN) and Image (JP) in FIG. 3 are image datasets disjoint from one another. Speech (EN), which is the audio caption in English, is associated with Image (EN). Speech (JP), which is the audio caption in Japanese, is associated with Image (JP).

The learning device 10 encodes Image (EN), Image (JP), Speech (EN), and Speech (JP) to obtain the features. When Image (EN) and Image (JP) are similar to each other, the learning device 10 regards a pair of Image (EN) and Speech (EN), and a pair of Image (JP) and Speech (JP) as expanded pairs.

The learning device 10 trains the model such that the features of data to be the expanded pair such as Speech (EN) and Speech (JP) become similar to each other, in addition to the features of data in the original pairs of Image (EN) and Speech (EN), and Image (JP) and Speech (JP).

Returning to FIG. 1, the image feature calculation unit 111 calculates the image feature using the image encoder serving as the model that receives the image and outputs the image feature obtained by mapping the image into the embedding space. The image encoder information 112 is a set of parameters for building the image encoder.

The image feature calculation unit 111 builds the image encoder with reference to the image encoder information 112. The image feature calculation unit 111 supplies the image 151 to the image encoder, and obtains the image feature. In other words, the image feature calculation unit 111 receives the image, and outputs the image feature.

The audio feature calculation unit 121 calculates the audio feature using the audio encoder serving as the model that receives the speech in the predetermined language and outputs the audio feature obtained by mapping the speech into the embedding space, and that includes a neural network provided with a self-attention mechanism. The audio encoder information 122*a* and the audio encoder information 122*b* are sets of parameters for building the audio encoders for the corresponding languages.

The audio feature calculation unit 121 builds the audio encoders with reference to the audio encoder information 122*a* and 122*b*. The audio feature calculation unit 121 supplies each of the audio captions 152*a* and 152*b* to a corresponding one of the audio encoders, and obtains the audio feature. In other words, the audio feature calculation unit 121 receives the audio captions, and outputs the audio features. The audio feature calculation unit 121 uses the audio encoders corresponding to the respective different languages to calculate the audio features of the speeches in the respective different languages.

As described above, each of the image encoder and the audio encoders outputs the feature mapped into the embedding space. The embedding space is herein called a latent space. The latent space is a space shared by the image feature and the audio features.

Figure 4:
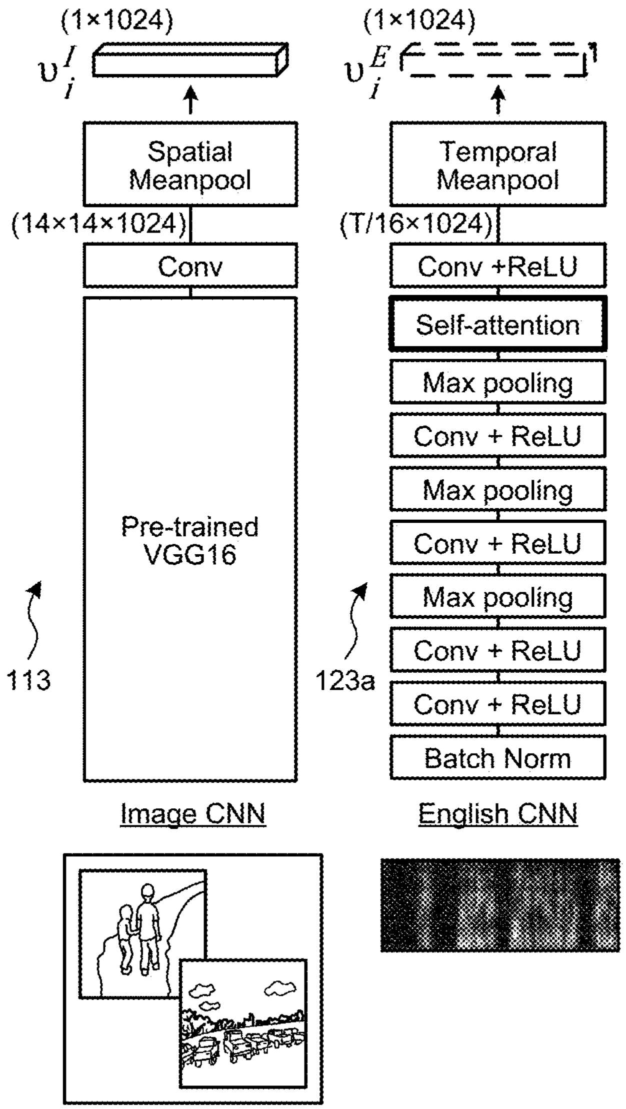
FIG. 4 is a schematic diagram of encoders.

The encoders and the latent space will be described in detail using FIG. 4. FIG. 4 is a schematic diagram of the encoders. Each of an image encoder 113 and an audio encoder 123*a* includes a convolutional neural network (CNN). The image encoder 113 includes the CNN for the image. The audio encoder 123*a* includes the CNN for English. The learning device 10 can build an audio encoder 123*b* including the CNN for Japanese from the audio encoder information 122*b*. The image encoder 113 further includes a layer that performs spatial mean pooling. Each of the audio encoders includes a layer that performs temporal mean pooling. Each of the encoders maps the feature output therefrom into the latent space.

Herein, $I_i$ denotes the i-th image. In addition, $A_i^E$ denotes an audio caption in English corresponding to the image $I_i$. At this time, the image encoder 113 maps the image $I_i$ into the d-dimensional latent space. The audio encoder 123*a* maps the audio caption $A_i^E$ into the d-dimensional latent space.

The symbol d denotes the number of dimensions determined in advance. In the present embodiment, for example, d is 1024.

Using FIG. 4, the following describes processing performed by the image feature calculation unit 111 to obtain the image feature. First, the image feature calculation unit 111 supplies a red-green-blue (RGB) image (three-channels) having 224×224 pixels to the image encoder 113. The image encoder 113 includes layers up to conv5 in a pre-trained VGG16 network (refer to Reference Literature 1).

Reference Literature 1: K. Simonyan and A. Zisserman, "Very Deep Convolutional Networks for Large-Scale Image Recognition," in Proc. ICLR, 2015.

The image encoder 113 outputs a 512×14×14 tensor from the layers up to conv5 in the VGG16 network as an intermediate feature. In other words, the image encoder 113 reduces the image having 224×224 pixels to an image having 14×14 pixels. The intermediate feature denotes a feature obtained in the process of the output of the image feature by the image encoder or in the process of the output of the audio feature by the audio encoder.

Moreover, the image encoder 113 supplies the 512×14×14 tensor to the cony layer constituted by d filters having a kernel size of 3×3, and outputs a d×14×14 tensor. Furthermore, the image encoder 113 performs the spatial mean pooling in a spatial meanpool layer, and outputs a d-dimensional image feature vector $v_i^I$. The image feature calculation unit 111 obtains the image feature vector output from the image encoder 113 as the image feature. The feature vector can be said to be a vector embedded into the d-dimensional space.

Using FIG. 4, the following describes processing performed by the audio feature calculation unit 121 to obtain each of the audio features. Herein, the audio encoder 123*a* and the audio encoder 123*b*, which is not illustrated, have the same configuration.

First, the audio feature calculation unit 121 supplies the audio encoder 123*a* with T×F mel filter bank output series obtained by performing frequency analysis with a frame shift length of 10 ms and a frame length of 25 ms, and performing mel filter bank processing with 40 mel filter banks on the audio caption. The form of the speech supplied to the audio encoder 123*a* is not limited to the mel filter bank output series. For example, the audio encoder 123*a* may be supplied with, for example, a short-time Fourier transform (STFT) and mel-frequency cepstrum coefficients (MFCCs).

The audio feature calculation unit 121 calculates the audio feature of each of the speeches in the different languages made to have a fixed length by truncation or zero-padding. This calculation enables mini-batch processing of the audio captions having different durations. For example, if the time of the audio caption is longer than T, the audio feature calculation unit 121 truncates the audio caption later than T, and if the time is shorter than T, the audio feature calculation unit 121 performs the zero-padding. The symbol T denotes a duration of the audio caption determined in advance. In the present embodiment, for example, T is 3072 (ms).

The audio encoder 123*a* includes a CNN-based DAVEnet (refer to Non Patent Literature 1), and a self-attention layer (refer to Reference Literature 2). In the example of FIG. 4, the self-attention layer is disposed on an output side of the DAVEnet.

Reference Literature 2: H. Zhang, I. Goodfellow, D. Metaxas, and A. Odena, "Self-Attention Generative Adversarial Networks," in Proc. ICML, 2019.

The audio encoder 123*a* outputs a 512×T/16 tensor as the intermediate feature from a max pooling layer serving as the last layer of the DAVEnet. The intermediate feature output by the DAVEnet is denoted as $x \in R^D \times N$. To calculate a self-attention map, the audio encoder 123*a* uses Expressions (1-1) and (1-2) to perform feature conversion in the self-attention layer.

$$f(x)=W_f x \tag{1-1}$$

$$g(x)=W_g x \tag{1-2}$$

The symbol D denotes the number of channels. The symbol N corresponds to a duration of the intermediate feature (in this case, T/16). The feature conversion in the self-attention layer is achieved by pointwise convolution performed by a 1×1 convolution layer. For example, in the present embodiment, D is 512, and ¯D (D with an overline) is D/8=64.

Furthermore, the audio encoder 123*a* uses Expressions (2-1) and (2-2) to calculate a self-attention map β. The symbol β denotes an N×N matrix. The symbol $s_{i,j}$ denotes a degree of similarity between the i-th audio feature and the j-th audio feature. As given by Expression (2-2), the audio encoder 123*a* calculates the self-attention map β in which an element $\beta_{i,j}$ is obtained by normalizing $s_{i,j}$ in the row direction using a softmax function.

$$s_{i,j} = f(x_i)^T g(x_j) \tag{2-1}$$

$$\beta_{i,j} = \frac{\exp(s_{i,j})}{\sum_{i=1}^{T} \exp(s_{i,j})} \tag{2-2}$$

Furthermore, the audio encoder 123*a* calculates o=xβ based on the intermediate feature x and the self-attention map, and further obtains y=x+oγ as an output of the self-attention layer. The symbol γ denotes one of the parameters optimized by the training.

Word-level information is known to be obtained in a layer on the output side of the DAVEnet (refer, for example, to Non Patent Literature 1). Therefore, as in the present embodiment, the self-attention layer is disposed on the output side of the DAVEnet, and as a result, segments of important words are expected to be obtained from the audio caption.

The audio encoder 123*a* supplies the output of the self-attention layer to a cony layer constituted by d filters having a kernel size of 1×17, and outputs a d×T/16 tensor. Furthermore, the audio encoder 123*a* performs the temporal mean pooling in a temporal meanpool layer, and outputs a d-dimensional audio feature vector $v_i^E$. The audio feature calculation unit 121 obtains the audio feature vector output from the audio encoder 123*a* as the audio feature.

As described above, in the audio feature calculation unit 121, based on the intermediate feature having elements for each temporal segment obtained in the process of calculating the audio feature, the self-attention mechanism outputs the self-attention map representing the degree of similarity between the elements, and calculates the audio feature by multiplying the intermediate feature by the self-attention map. In the present embodiment, the self-attention mechanism is implemented as the self-attention layer.

The learning device 10 trains the parameters of the encoders so as to dispose the feature vectors between the speeches selected as the expanded pair close to one another in the latent space, in addition to disposing the image feature vector $v_i^I$ and the audio feature vector $v_i^E$ close to one another in the latent space. Therefore, the loss function forming unit 131 forms a triplet loss having 12 directional components for each set obtained by combining two feature vectors (refer, for example, to Reference Literature 3) as a loss function. The loss function is not limited to the triplet loss, and may be, for example, a loss with semi-hard negative mining or a masked margin softmax loss (refer, for example, to Non Patent Literature 1 and Reference Literature 4).

Reference Literature 3: D. Harwath, G. Chuang, and J. Glass, "Vision as an Interlingua: Learning Multilingual Semantic Embeddings of Untranscribed Speech," in Proc. ICASSP, 2018.

Reference Literature 4: G. Ilharco, Y. Zhang, and J. Baldridge, "Large-Scale Representation Learning from Visually Grounded Untranscribed Speech," in Proc. CoNLL, 2019.

A forming method of a loss function performed by the loss function forming unit 131 will be described in detail. In this example, paired data ($I_i^X$, $A_i^X$) of an image and the audio caption in language X, and paired data ($I_j^Y$, $A_i^Y$) of an image and the audio caption in language Y are supplied as learning data. Each paired data forms a dataset, and suffixes i and j are reference numerals for identifying the paired data in the dataset. For example, the language X and the language Y are English and Japanese.

In the following expressions, the d-dimensional feature vectors output from the encoders are represented by bold letters. For example, the feature vector obtained by supplying the image $I_i^X$ (I is represented by a non-bold letter) to the image encoder is expressed as $I_i^X$ (I is represented by a bold letter). Moreover, for example, the feature vector obtained by supplying the audio caption $A_i^X$ (A is represented by a non-bold letter) to the audio encoder is expressed as $A_i^X$ (A is represented by a bold letter).

That is, the image feature calculation unit 111 calculates the image feature, which is a feature of each image, included in the dataset in language X serving as the dataset of a pair of the image $I_i^X$ and the speech $A_i^X$ in language X, and the dataset in language Y serving as the dataset of a pair of the image $I_i^Y$ and the speech $A_j^Y$ in language Y, using the model (image encoder) that receives the image and outputs the feature obtained by mapping the image into the embedding space.

The audio feature calculation unit 121 calculates the audio feature, which is a feature of each speech, included in the dataset in language X and the dataset in language Y, using the model (audio encoder) that receives the speech and outputs the feature obtained by mapping the speech into the embedding space.

The loss function forming unit 131 selects the similar image similar to each target image serving as an image in a first dataset, from the images included in a second dataset. A combination of the target image and the similar image is the expanded pair. At this time, the loss function forming unit 131 functions as a selection unit.

When the symbol B denotes the batch size, the dataset supplied to the learning device 10 is as given by Expression (3). The symbols I and A in Expression (3) are all represented by bold letters indicating vectors.

$$\{I_i^X, A_i^X\}_{i=1}{}^B,\ \{I_j^Y, A_j^Y\}_{j=1}{}^B \tag{3}$$

The loss function forming unit 131 selects the similar image from the images in the N sets of datasets indicated by Expression (4). The symbols I and A in Expression (4) are all represented by bold letters indicating vectors.

$$\{I_n^X, A_n^X\}_{n=1}{}^N,\ \{I_n^Y, A_n^Y\}_{n=1}{}^N \tag{4}$$

As given by Expression (5), the loss function forming unit 131 calculates an image similarity matrix S (B×N matrix) of the image of the dataset in language Y with respect to the image of the dataset in language X, and selects the image $I_{li}^Y$ having the highest degree of similarity with the target image $I_i^X$ as the similar image. Thus, the loss function forming unit 131 determines the expanded pair of the images of the dataset in language X. The arguments I in the function s in Expression (5) are both represented by bold letters indicating vectors.

$$S_{i,n} = s(I_i^X, I_n^Y),\ l_i = \underset{n}{\operatorname{argmax}}\, S_i \tag{5}$$

$$\Rightarrow \text{Expanded pair for } (I_i^X, A_i^X):\ (I_{l_i}^Y, A_{l_i}^Y)$$

$$\text{where } s(a, b) = a^T b$$

In the same way, as given by Expression (6), the loss function forming unit 131 calculates an image similarity matrix S (B×N matrix) of the image of the dataset in language X with respect to the image of the dataset in language Y, and selects the image $I_{mj}^X$ having the highest degree of similarity with the target image $I_j^Y$ as the similar image. Thus, the loss function forming unit 131 determines the expanded pair of the images of the dataset in language Y. The arguments I in the function s in Expression (6) are both represented by bold letters indicating vectors.

$$S_{j,n} = s(I_j^X, I_n^Y),\ m_j = \underset{n}{\operatorname{argmax}}\, S_j \tag{6}$$

$$\Rightarrow \text{Expanded pair for } (I_j^Y, A_j^Y):(I_{m_j}^X, A_{m_j}^X)$$

The loss function forming unit 131 forms the loss function $L_s$ as given by Expression (7). The symbols I and A in Expression (7) are all represented by bold letters indicating vectors.

$$\begin{aligned} L_s = \sum_{i=1}^{B} \left(\operatorname{rank}(I_i^X, A_i^X\ A_{i_1}^X) + \operatorname{rank}(A_i^X, I_i^X\ I_{i_2}^X)\right) + \\ \sum_{i=1}^{B} \left(\operatorname{rank}(I_j^Y, A_j^Y\ A_{j_1}^Y) + \operatorname{rank}(A_j^Y, I_j^Y\ I_{j_2}^Y)\right) + \\ \sum_{i=1}^{B} \operatorname{rank}(A_i^X, A_{l_i}^Y\ A_{l'}^X) + \sum_{j=1}^{B} \operatorname{rank}(A_j^Y, A_{m_j}^X\ A_{m'}^X) \end{aligned} \tag{7}$$

$$\text{where } \operatorname{rank}(a, p, n) = \max(0, \eta - s(a, p) + s(a, n))$$

$$i_1 \neq i,\ i_2 \neq i,\ j_1 \neq j,\ j_2 \neq j,\ l' \neq l_i,\ l' \neq l_i\ m' \neq m_j$$

As given by Expression (7), the rank function includes a (anchor), p (positive), and n (negative). The rank function outputs a higher value between 0 and a calculated value obtained by adding η, which is a hyperparameter, to the value of degree of similarity between a and n minus the degree of similarity between a and p.

The first term and the second term in the right side of the loss function in Expression (7) are terms that become smaller as the degree of similarity between the pair of ($I_i^X$, $A_i^X$) is increased than the degree of similarity between the images or speeches that are not paired (are disposed close to each other in the latent space). The third term and the fourth term in the right side of the loss function in Expression (7) are terms that become smaller as the degree of similarity between the pair of ($I_j^Y$, $A_j^Y$) is increased than the degree of similarity between the images or speeches that are not paired (are disposed close to each other in the latent space).

The fifth term in the right side of the loss function in Expression (7) is a term that becomes smaller as the degree of similarity between the speeches ($A_i^X$, $A_{li}^Y$) of the expanded pairs is increased than the degree of similarity between the images or speeches that are not paired (are disposed close to each other in the latent space).

The sixth term in the right side of the loss function in Expression (7) is a term that becomes smaller as the degree of similarity between the speeches ($A_j^Y$, $A_{mj}^X$) of the expanded pairs is increased than the degree of similarity between the images or speeches that are not paired (are disposed close to each other in the latent space).

The loss function forming unit 131 may also form the loss function $L_s$ as given in Expression (8). The symbols I and A in Expression (8) are all represented by bold letters indicating vectors.

$$L_s = \sum_{i=1}^{B}\left(\mathrm{rank}\left(I_i^X,\ A_i^X\ A_{i_1}^X\right) + \mathrm{rank}\left(A_i^X,\ I_i^X\ I_{i_2}^X\right)\right) + \sum_{i=1}^{B}\left(\mathrm{rank}\left(I_j^Y,\ A_j^Y\ A_{j_1}^Y\right) + \mathrm{rank}\left(A_j^Y,\ I_j^Y\ I_{j_2}^Y\right)\right) + \sum_{i=1}^{B} w_{i,l_i}\mathrm{rank}\left(A_i^X,\ A_{l_i}^Y\ A_{l'}^Y\right) + \sum_{j=1}^{B} w_{j,m_j}\mathrm{rank}\left(A_j^Y,\ A_{m_j}^X\ A_{m'}^X\right) \quad (8)$$

For example, weights $w_{i,li}$ and $w_{j,mj}$ in Expression (8) are the inner products of the pairs. The weights indicate that there are various degrees of similarity between the target image and the similar image of the expanded pairs, and there are various degrees of similarity between the speeches of the expanded pairs. For example, the weight is increased with an increase in the degree of similarity between the target image and the similar image of the expanded pairs, and influence on the training of the weighted term is increased.

The updating unit 132 updates the parameters of the models so as to optimize the loss function formed by the loss function forming unit 131. The updating unit 132 updates the parameters of the models used by the image feature calculation unit 111 and the audio feature calculation unit 121 such that the image feature of each of the images included in the dataset in language X and the dataset in language Y is similar to the audio feature of the speech paired with the image (for example, corresponds to the first term to the fourth term in the right side of Expression (7)), and that the audio feature of the speech paired with the target image is similar to the audio feature of the speech paired with the similar image (for example, corresponds to the fifth term and the sixth term in the right side of Expression (7)).

For example, the updating unit 132 updates the parameters according to the following settings, while reducing the loss function using a stochastic gradient method.

Momentum: 0.9

Weight decay: $5\times10^{-7}$

Initial learning rate: 0.001

Reduction in learning rate: Learning rate is reduced to 1/40 for each 10 epochs

The updating unit 132 may also use other optimization algorithms such as Adam and RMSProp instead of the stochastic gradient method.

Processing of First Embodiment

Figure 6:
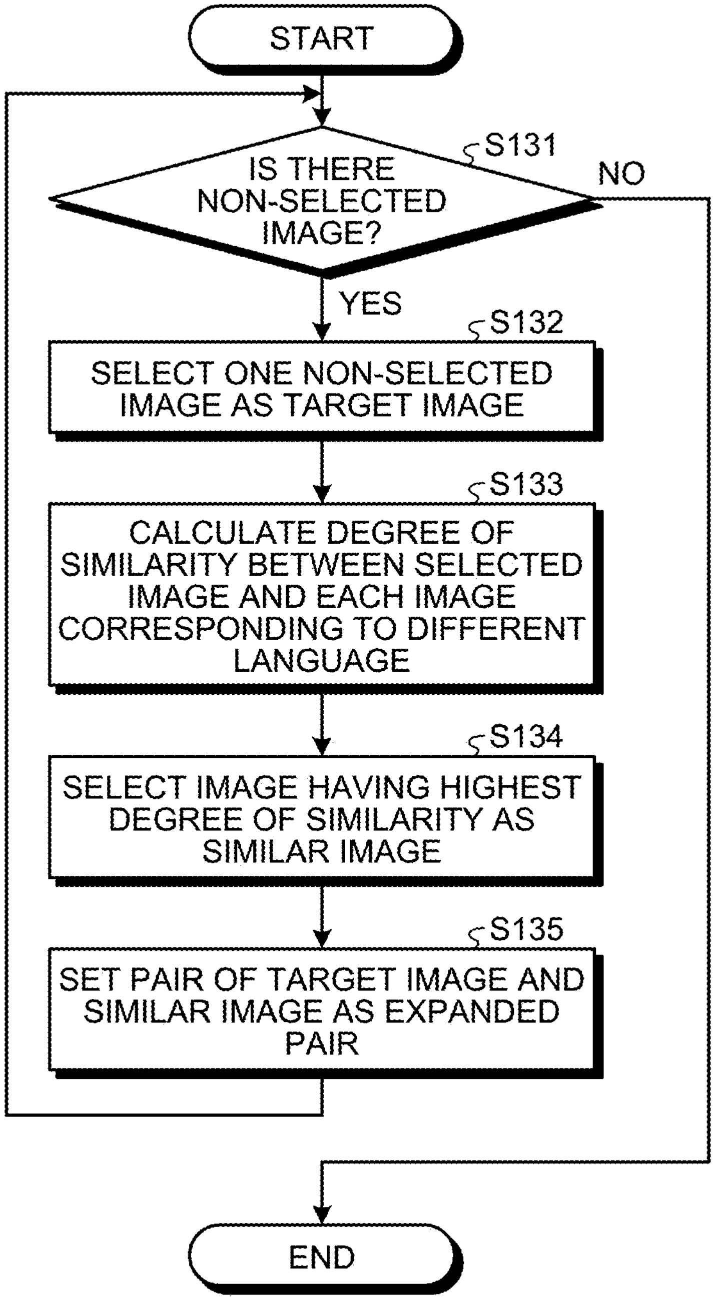
FIG. 6 is a flowchart illustrating a flow of processing of selecting expanded pairs.

FIG. 6 is a flowchart illustrating a flow of processing of the learning device according to the first embodiment. First, as illustrated in FIG. 6, the datasets of a pair in language X (image corresponding to language X+audio caption in language X) and a pair in language Y (image corresponding to language Y+audio caption in language Y) are supplied to the learning device 10 (step S11).

Next, the learning device 10 calculates the features of the images and the audio captions using the encoders (step S12). The learning device 10 then selects the expanded pairs (step S13).

Subsequently, the learning device 10 forms a loss function to increase the degree of similarity between the pairs and the degree of similarity between the expanded pairs (step S14). For example, the learning device 10 forms the loss function to increase the degree of similarity between the features of the images and the features of the speeches of the original pairs, and the degree of similarity between the features of the speeches of the expanded pairs. The learning device 10 then updates the parameters of the encoders to optimize the loss function (step S15).

Figure 5:
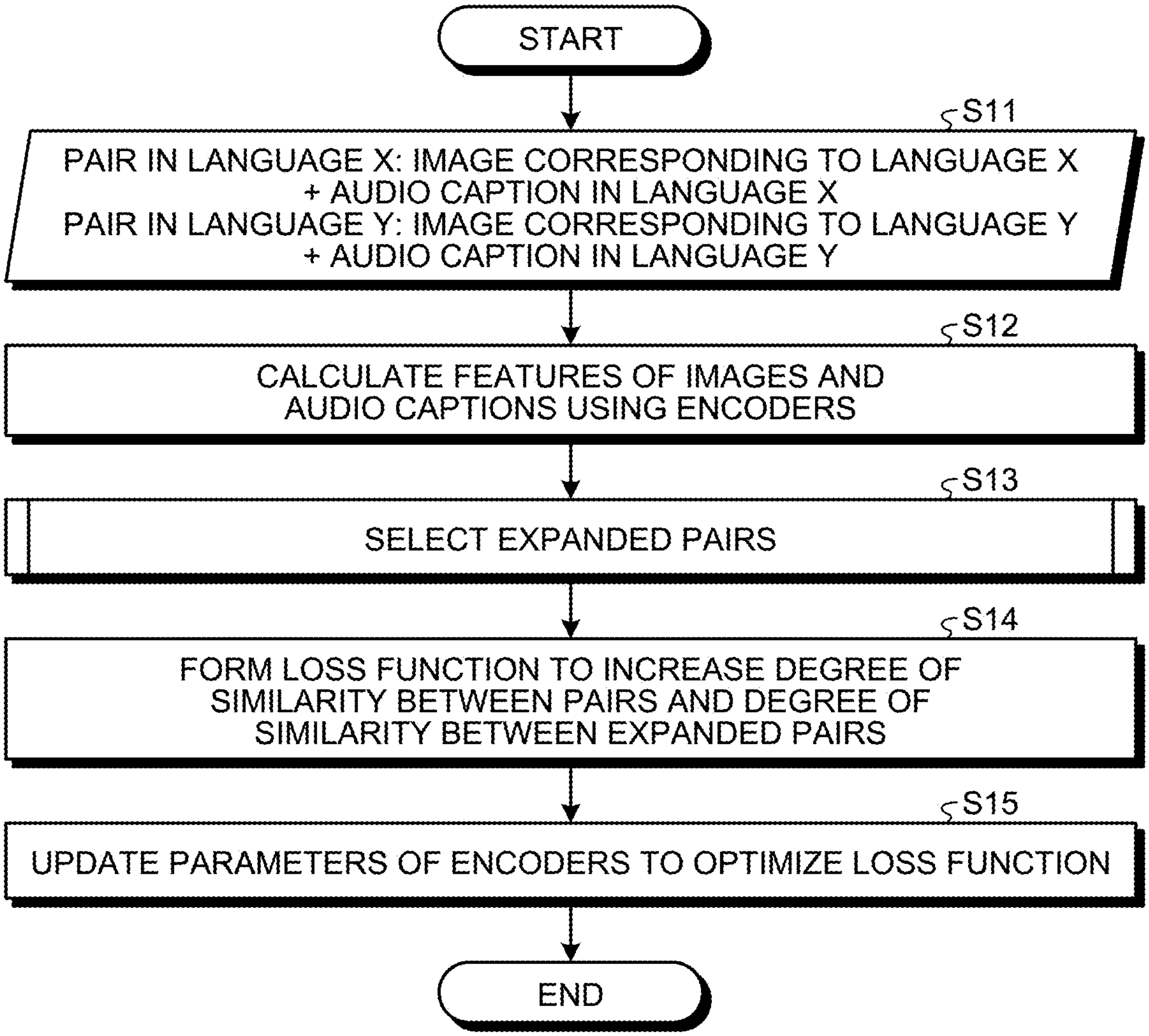
FIG. 5 is a flowchart illustrating a flow of processing of the learning device according to the first embodiment.

With reference to FIG. 6, the selection processing of expanded pairs corresponding to step S13 in FIG. 5 will be described. FIG. 6 is a flowchart illustrating a flow of processing of selecting expanded pairs. The learning device 10 repeats processing subsequent to step S132 until there is no more non-selected image (No at step S131).

If there is a non-selected image (Yes at step S131), the learning device 10 selects one non-selected image as a target image (step S132). The learning device 10 then calculates the degree of similarity between the selected image and each image corresponding to the different language (step S133). For example, when the image of the dataset in language X is selected, the learning device 10 calculates the degree of similarity between the selected image and the image of the dataset in language Y.

In this example, the learning device 10 selects the image having the highest degree of similarity as the similar image (step S134). The learning device 10 then sets the pair of the target image and the similar image as the expanded pair (step S135). The target image and the similar image have been paired with the audio captions. Such audio captions are also considered as the expanded pair.

The first embodiment is an embodiment in which the modalities are the image and the speech in a specific language. However, the modalities are not limited thereto, and may also be video, predetermined sensing data, and the like.

In other words, the learning device 10 calculates the feature of each data included in a pair of datasets in which two modalities among a plurality of modalities are combined, using a model that receives the data on the corresponding modality among the modalities and outputs the feature obtained by mapping the received data into the embedding space.

The learning device 10 then selects the similar data similar to each target data that is the data on the first modality in the first dataset of the datasets, from the data on the second modality included in the second dataset of the datasets. For example, the first dataset and the second dataset correspond to the dataset in language X and the dataset in language Y.

The first modality and the second modality may be the same. In the first embodiment, the first modality and the second modality correspond to an image.

The learning device 10 further updates the parameters of the model such that the features of the data in the pair included in the first and the second datasets are similar to one another, and the feature of the data paired with the target data is similar to the feature of the data paired with the similar data.

In this manner, by optimizing the model by regarding the target data and the similar data that are not original paired data as the expanded pair, it is possible to improve the accuracy of the model for cross-modal data retrieval, even if there is not enough data associated with information on different modalities.

The learning device 10 updates the parameters such that a loss function is minimized, the loss function including a term that becomes smaller with an increase in the degree of similarity between the features of the data in the pair included in the first dataset; a term that becomes smaller with an increase in the degree of similarity between the features of the data in the pair included in the second dataset; and a term that becomes smaller with an increase in the degree of similarity between the feature of the data paired with the target data and the feature of the data paired with the similar data and that can set the weight as a hyperparameter.

In this manner, the learning device 10 can optimize the degree of similarity between the original pairs and the degree of similarity between the expanded pairs at the same time, by forming the loss function given in Expression (7).

The learning device 10 further selects the similar data similar to each target data that is the data on the second modality in the second dataset of the datasets, from the data on the first modality included in the first dataset of the datasets. As indicated in Expression (5) and Expression (6), this means that the learning device 10 selects both of the expanded pairs based on the dataset in language X and the expanded pair based on the dataset in language Y. Thus, the learning device 10 can further improve the accuracy of the model.

The learning device 10 can calculate the feature of each data included in a pair of datasets in which two from an image, video, speech in a specific language, and predetermined sensing data are combined as modalities.

Second Embodiment

In the second embodiment, processing will be described that actually performs inference using the model trained in the first embodiment. The image encoder and the audio encoder after being trained enable cross-modal retrieval. The cross-modal retrieval refers to retrieval of data in different modals. The cross-modal retrieval includes, for example, retrieval of an image based on a speech, retrieval of a speech based on an image, and retrieval of a speech in a language based on a speech in another language. In the description of the embodiments, parts having the same functions as those of the already described embodiment will be denoted by the same reference numerals, and the description thereof will not be repeated where appropriate.

Configuration of Second Embodiment

Figure 7:
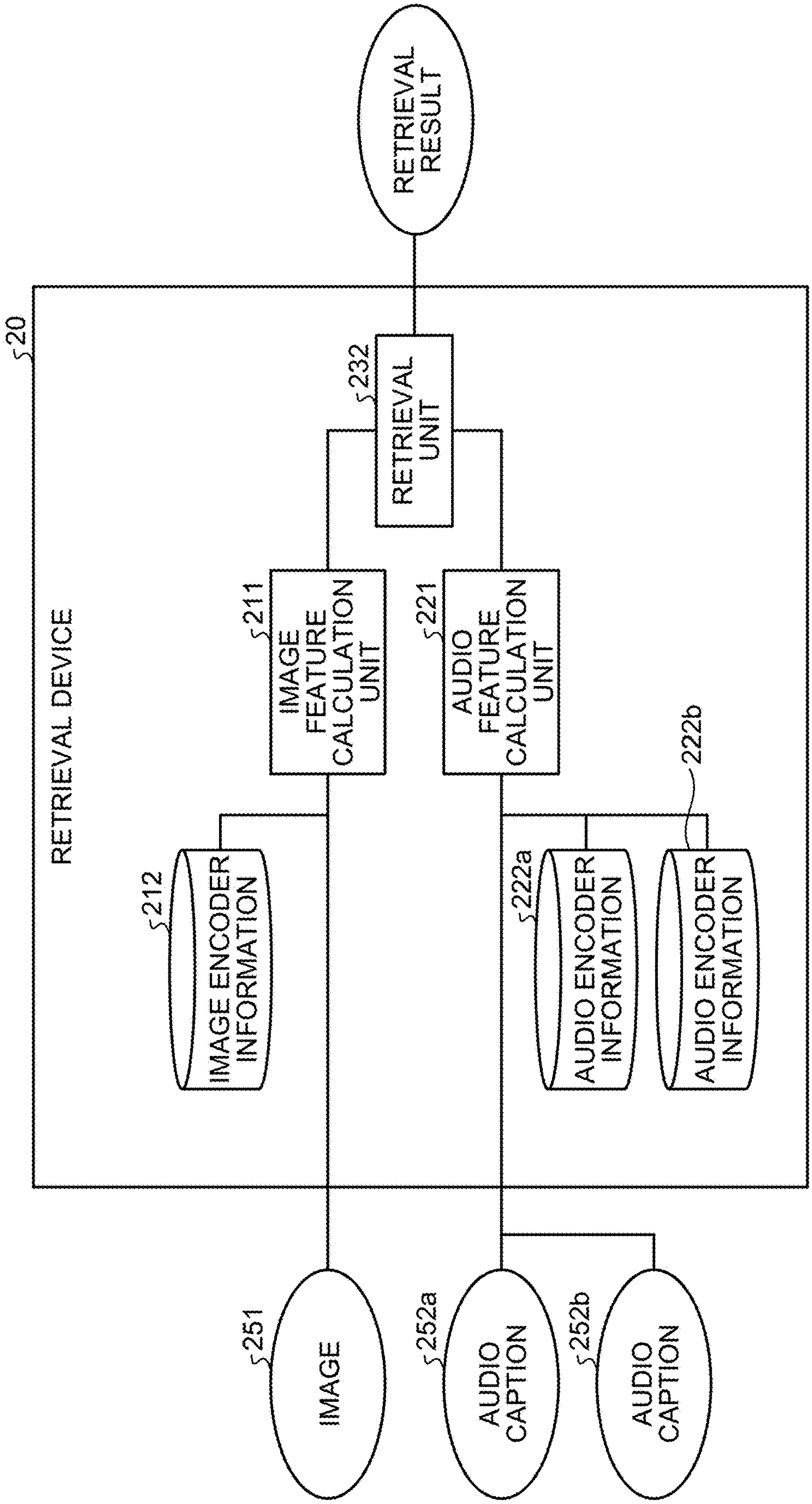
FIG. 7 is a diagram illustrating a configuration example of a retrieval device according to a second embodiment.

FIG. 7 is a diagram illustrating a configuration example of a retrieval device according to a second embodiment. As illustrated in FIG. 7, a retrieval device 20 includes an image feature calculation unit 211, an audio feature calculation unit 221, and a retrieval unit 232. The retrieval device 20 stores image encoder information 212 and audio encoder information 222.

The retrieval device 20 receives an image and audio captions in different languages. The image received by the retrieval device 20 is a query for retrieval. For example, the retrieval device 20 outputs the audio caption obtained by the retrieval as a retrieval result.

In the same way as the image feature calculation unit 111 of the learning device 10, the image feature calculation unit 211 receives an image as an input, and calculates the image feature. The image encoder information 212 has been trained using the method described in the first embodiment. That is, the image feature calculation unit 211 calculates the image feature using the model that receives the image and outputs the image feature obtained by mapping the image into the latent space, and that is trained such that the image feature is similar to the feature obtained by mapping the speech corresponding to the image into the latent space.

In the same way as the audio feature calculation unit 121 of the learning device 10, the audio feature calculation unit 221 receives the audio caption as an input, and outputs the audio feature. The audio encoder information 222 has been trained using the method described in the first embodiment. That is, the audio feature calculation unit 221 calculates the audio feature using the model that receives the speech in the predetermined language and outputs the audio feature obtained by mapping the speech into the latent space, that includes the neural network provided with the self-attention mechanism, and that is trained such that the audio feature is similar to the feature obtained by mapping the image corresponding to the speech into the latent space. The retrieval device 20 may also store the image feature calculated by the image feature calculation unit 211.

The retrieval device 20 may also use a plurality of audio encoders corresponding to different languages. Audio encoder information 222*a* and audio encoder information 222*b* correspond to English and Japanese, respectively.

The retrieval unit 232 retrieves the similar speech based on the image feature. For example, the retrieval unit 232 retrieves, from the stored audio feature information, the audio feature similar to the image feature calculated based on the received image, and outputs the speech corresponding to the obtained audio feature. As described in the first embodiment, both the audio feature and the image feature are mapped into the same latent space. More specifically, both the audio feature and the image feature are d-dimensional vectors. Therefore, the retrieval unit 232 can easily compare the degree of similarity between the audio feature and the image feature by, for example, calculating inner products.

Processing of Second Embodiment

Figure 8:
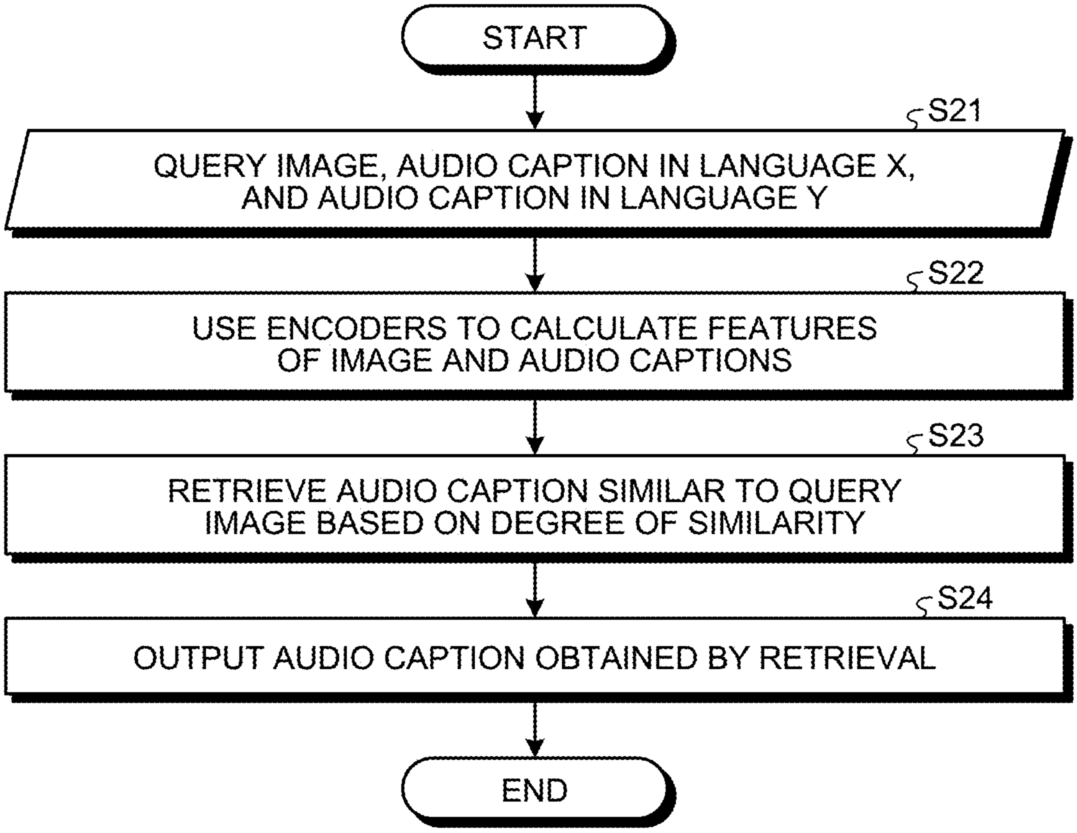
FIG. 8 is a flowchart illustrating a flow of processing of the retrieval device according to the second embodiment.

FIG. 8 is a flowchart illustrating a flow of processing of the retrieval device according to the second embodiment. As illustrated in FIG. 8, the retrieval device 20 first receives the image serving as a query, the audio caption in language X, and the audio caption in language Y (Step S21).

The retrieval device 20 uses the encoders to calculate the features of the image and the audio captions (step S22). The retrieval device 20 may also store the features of the audio captions.

The retrieval device 20 retrieves the audio caption similar to the query image based on the degree of similarity (step S23). Moreover, the retrieval device 20 outputs the audio caption obtained by the retrieval (step S24).

Effects of Second Embodiment

As described above, according to the second embodiment, the cross-modal retrieval can be performed to retrieve the image based on the speech. The retrieval device 20 may also perform cross-lingual retrieval that retrieves speeches in different languages using a speech as a query.

Experimental Results

The following describes experiments conducted using the retrieval device according to the second embodiment. In the experiments, the retrieval was performed using the retrieval devices of the second embodiment using the encoders trained by the learning device of the first embodiment.

In the experiments, English and Japanese correspond to language X and language Y, respectively. The dataset in English includes 98555 sets of images and audio captions in English associated with the images. The dataset in Japanese includes 98555 sets of images and audio captions in Japanese associated with the images.

In the experiments, the same image is not included in the dataset in English and the dataset in Japanese. However, in the first embodiment and the second embodiment, the same image may be included in the datasets in different languages.

Of the pairs of 98555 sets of images and audio captions in each dataset, 97555 sets were used as data for learning and 1000 sets were used as data for retrieval. Moreover, in the experiments, conditions such as parameters were set as listed below. Conditions not described herein are equivalent to those described in the embodiments.

Duration T of audio caption: 20 seconds
Number of dimensions d of latent space: 1024
Loss function: Expression (7)
Hyperparameter $\eta$ in loss function: 1
Batch size B: 100
Evaluation metric: Recall@N In the experiments, when an evaluation feature vector forming a pair with a feature vector obtained from a query is retrieved from the 1000 sets, N sets having a high degree of similarity are determined.

The retrieval is successful if the pair of the feature vector obtained from the query and the evaluation feature vector is included in the N sets. At this time, the percentage of successful retrieval is denoted as Recall@N. Recall@N may be abbreviated as R@N.

In the second embodiment, the audio caption is retrieved using an image as a query. The retrieval device 20 can also retrieve the audio caption by calculating the degree of similarity between other feature vectors using any feature vector as a query.

For example, the retrieval device 20 can retrieve an image using the speech in English as a query. Moreover, the retrieval device 20 can retrieve the speech in Japanese using the speech in English as a query (cross-lingual retrieval).

FIG. 9 is a chart illustrating experimental results. As described in Expression (4), the symbol N denotes the number of sets of data from which the similar image is selected. Baseline denotes the results obtained when the loss function not including the term related to the expanded pair (the fifth term and the sixth term in Expression (7)) is used. VGG16 denotes the results obtained when the degree of similarity of appearance is used to calculate the degree of similarity to select the expanded pair. For example, in this case, the Jensen-Shannon divergence calculated using $S_{i,n}=-JS(O_i^X, O_n^Y)$ from the output 0 of the image recognition device (VGG16) is used as the degree of similarity. Embedding denotes the results obtained by using the same method as in the first embodiment.

The symbol I→E means that the speech in English is retrieved using an image as a query. The symbol E→I means that an image is retrieved using the speech in English as a query. The symbol I→J means that the speech in Japanese is retrieved using an image as a query. The symbol J→I means that an image is retrieved using the speech in Japanese as a query. The symbol J→E means that the speech query in English is retrieved using the speech in Japanese as a query. The symbol E→J means that the speech query in Japanese is retrieved using the speech in English as a query.

FIG. 9 demonstrates that Recall@N tends to improve in (VGG16, Embedding) than in the Baseline, when the term related to the expanded pair is included in the loss function. FIG. 9 also demonstrates that in the embedding, the accuracy is improved with an increase in N.

Figure 10:
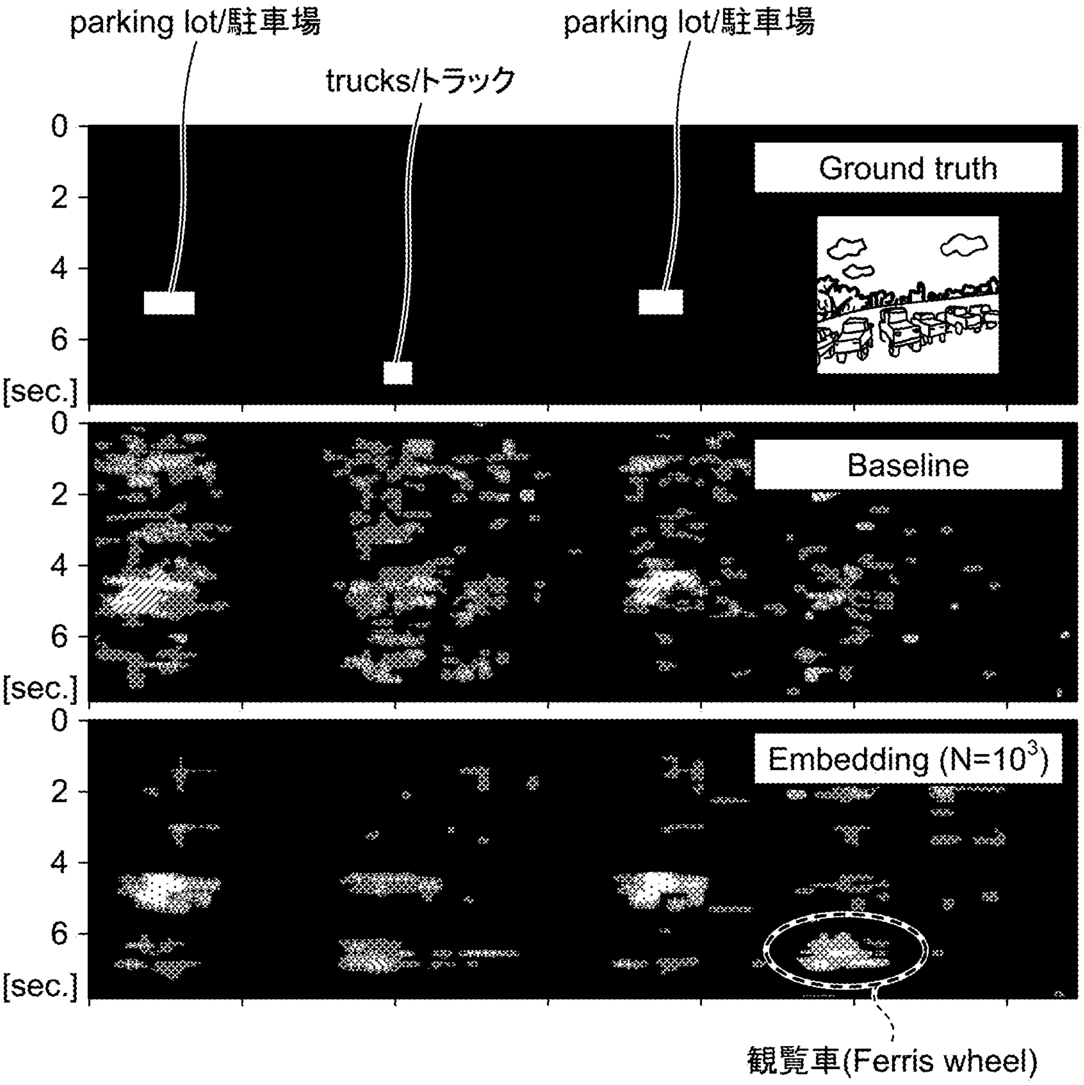
FIG. 10 is a diagram illustrating examples of results of translation knowledge obtained from the experiments.

FIG. 10 is a diagram illustrating examples of results of translation knowledge obtained from the experiments. The translation knowledge in FIG. 10 is obtained using the method described in Non Patent Literature 2. Ground truth denotes the results obtained when both captions in English and Japanese are associated with an image. The result is favorable as the result is closer to the Ground truth. As illustrated in FIG. 10, there is less noise in the Embedding ($N=10^3$) compared to that in the Baseline, and the correspondence between the languages is clearly illustrated.

As illustrated in FIG. 11, when the experiments were performed using the audio captions in Hindi instead of using the audio captions in Japanese, it was also found that Recall@N tends to improve in (VGG16, Embedding) than in the Baseline, when the term related to the expanded pair is included in the loss function.

Other Examples of Modality

The examples in which the modality is mainly the image and the speech in a specific language have been described. However, as described above, various modalities other than those described above are also applicable to the embodiments.

The modalities of the paired data are placed as (A, B) and (C, D). The symbols in parentheses ( ) are paired. For example, in the embodiments described above, A is an image, B is the speech in English, C is an image, and D is the speech in Japanese. To select the expanded pair, the degree of similarity between A and C is calculated. Thus, the relation between A and C may be such that the degree of similarity can be defined.

B and D are audio captions in different languages. In this case, A and C may be video contents received from TV broadcasts and video distribution services. A and C may also be various types of sensing data. In this case, data on B or D can be collected, when the speakers of different languages perceive A or C, and explain the content in spoken language.

For example, it is assumed that A and C are data based on a biological sensor such as an electrocardiogram. In this case, the audio caption corresponding to B or D can be obtained from a doctor who speaks the predetermined language commenting on the abnormalities and the like found on the electrocardiogram. Because the electrocardiogram is represented by waveform signals, it is possible to apply the same frequency analysis and the like as in the embodiments.

Moreover, for example, it is assumed that A and C are outputs from the accelerometer attached to the athlete's body. In this case, the audio caption corresponding to B or D can be obtained from the speaker who speaks the predetermined language observing and explaining the movement of the athlete (for example, swinging of a bat in baseball).

A and C may be different from each other. For example, A may be an image (still image), B may be speech in English, C may be video (moving image), and D may be speech in Japanese. In this case, it is possible to define the degree of similarity between A and C and select the expanded pair, by comparing between a representative frame of the moving image and the still image, generating a moving image in which a plurality of still images are arranged over a plurality of frames, and the like.

A known method can be used as the method for mapping data of various modalities into the common embedding space. For example, by using the neural network, it is possible to map the data in various forms into the specific space.

System Configuration, etc.

The components of the devices illustrated in the drawings are merely functionally conceptual, and need not be physically configured as illustrated in the drawings. In other words, the specific modes of dispersion and integration of the devices are not limited to those illustrated in the drawings, and all or some of the devices can be configured in a functionally or physically dispersed or integrated manner in any units according to various types of loads or use conditions. Furthermore, all or any part of the processing functions performed by the devices can be implemented by a central processing unit (CPU) or a computer program that is analyzed and executed by the CPU, or can be implemented as hardware based on a wired logic.

Of the processes described in the embodiments described herein, all or some of the processes described as automatically performed can also be manually performed, and all or some of the processes described as manually performed can also be automatically performed using known methods. In addition, the information including the processing procedures, the control procedures, the specific names, and the various types of data and parameters illustrated in the above description and the drawings can be freely modified unless otherwise specified.

Computer Programs

As an embodiment, the learning device 10 and the retrieval device 20 can each be implemented by installing a computer program for executing the above-described learning processing or retrieval processing as package software or on-line software on a desired computer. For example, an information processing device can serve as the learning device 10 or the retrieval device 20 by executing the above-described computer program. Examples of the information processing device mentioned herein include a desktop personal computer and a laptop personal computer. Other examples of the information processing device in that category include mobile communication terminals such as a smartphone, a mobile phone, and a Personal Handy-phone System (PHS) device, and further, slate computers such as a personal digital assistant (PDA).

A terminal device used by a user may be treated as a client, and the learning device 10 and the retrieval device 20 may be implemented as server devices that provide services related to the learning processing and the retrieval processing to the client. For example, one of the server devices is implemented as a server device that provides a service that receives the data for learning and outputs the information on the encoders after being trained. In this case, the server device may be implemented as a web server, or may be implemented as a cloud that provides the service related to the above-described processing through outsourcing.

Figure 12:
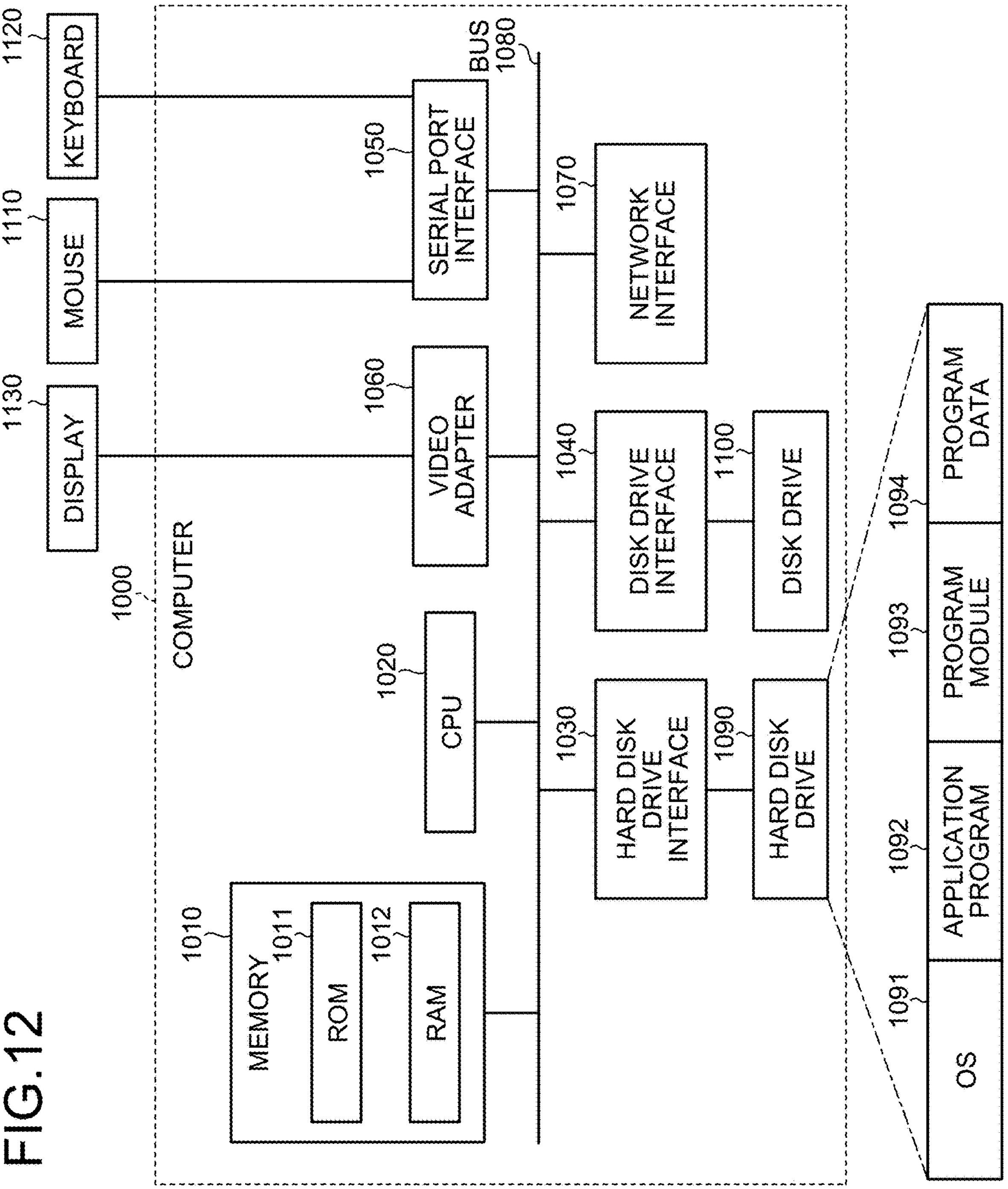
FIG. 12 is a diagram illustrating an example of a computer for executing a learning program.

FIG. 12 is a diagram illustrating an example of a computer for executing a learning program. The retrieval program may be executed by the same type of computer. A computer 1000 includes, for example, a memory 1010, and a CPU 1020. The computer 1000 also includes a hard disk drive interface 1030, a disk drive interface 1040, a serial port interface 1050, a video adapter 1060, and a network interface 1070. These parts are connected through a bus 1080.

The memory 1010 includes a read-only memory (ROM) 1011 and a random-access memory (RAM) 1012. The ROM 1011 stores therein, for example, a boot program such as the Basic Input-Output System (BIOS). The hard disk drive interface 1030 is connected to a hard disk drive 1090. The disk drive interface 1040 is connected to a disk drive 1100. For example, a removable storage medium such as a magnetic disk or an optical disc is inserted into the disk drive 1100. The serial port interface 1050 is connected to, for example, a mouse 1110 and a keyboard 1120. The video adapter 1060 is connected to, for example, a display 1130.

The hard disk drive 1090 stores therein, for example, an operating system (OS) 1091, an application program 1092, program modules 1093, and program data 1094. That is, the computer program defining the processes of the learning device 10 is implemented as the program modules 1093 describing codes executable by the computer. The program modules 1093 are stored in, for example, the hard disk drive 1090. For example, the hard disk drive 1090 stores therein the program modules 1093 for executing the same processes as the functional components in the learning device 10. The hard disk drive 1090 may be substituted by a solid-state drive (SSD).

The setting data used in the processing of the embodiments described above is stored as the program data 1094 in, for example, the memory 1010 or the hard disk drive 1090. The CPU 1020 reads the program modules 1093 and the program data 1094 stored in the memory 1010 and the hard disk drive 1090 into the RAM 1012 as required, and executes the processing of the embodiments described above. The CPU 1020 may be coupled to the memory 1010 and programmed to execute a process of the embodiments described above.

The program modules 1093 and the program data 1094 are not limited to being stored in the hard disk drive 1090, and may be stored in, for example, a non-transitory computer-readable removable storage medium and read by the CPU 1020 through the disk drive 1100 or the like. Alternatively, the program modules 1093 and the program data 1094 may be stored in another computer connected through a network (for example, a local area network (LAN) or wide area network (WAN)). The program modules 1093 and the program data 1094 may be read by the CPU 1020 from the other computer through the network interface 1070.

The invention claimed is:

1. A learning device comprising: a memory; and a processor coupled to the memory and programmed to execute a process comprising:

firstly calculating an image feature, which is a feature of each image, included in a first dataset that is a dataset of a pair of an image and a speech in a first language, and a second dataset that is a dataset of a pair of an image and a speech in a second language, using a model that receives an image and outputs a feature obtained by mapping the image into an embedding space;

secondly calculating an audio feature, which is a feature of each speech, included in the first dataset and the second dataset, using a model that receives speech and outputs a feature obtained by mapping the speech into the embedding space;

calculating an image similarity matrix of the image of the first dataset with respect to the image of the second dataset;

selecting a similar image similar to each target image that is an image in the first dataset, from an image included in the second dataset based on the image similarity matrix; and updating a parameter of each model used by the firstly calculating and the secondly calculating such that the image feature of the image included in the first dataset and the second dataset, and the audio feature of the speech paired with the image are similar to one another; and the audio feature of the speech paired with the target image is similar to the audio feature of the speech paired with the similar image, wherein the updating updates the parameter such that a loss function is minimized, the loss function including a term that becomes smaller with an increase in a degree of similarity between features of the data in the pair included in the first dataset.

2. The learning device according to claim 1, wherein the loss function further includes a term that becomes smaller with an increase in a degree of similarity between the features of the data in the pair included in the second dataset; and a term that becomes smaller with an increase in a degree of similarity between the feature of the data paired with the target image and the feature of the data paired with the similar data, and that is capable of setting a weight as a hyperparameter.

3. A learning method, comprising:

firstly calculating feature, which is a feature of each image, included in a first dataset that is a dataset of a pair of an image and a speech in a first language, and a second dataset that is a dataset of a pair of an image and a speech in a second language, using a model that receives an image and outputs a feature obtained by mapping the image into an embedding space;

secondly calculating an audio feature, which is a feature of each speech, included in the first dataset and the second dataset, using a model that receives speech and outputs a feature obtained by mapping the speech into the embedding space;

calculating an image similarity matrix of the image of the first dataset with respect to the image of the second dataset;

selecting a similar image similar to each target image that is an image in the first dataset, from an image included in the second dataset based on the image similarity matrix; and updating a parameter of each model used by the firstly calculating and the secondly calculating such that the image feature of the image included in the first dataset and the second dataset, and the audio feature of the speech paired with the image are similar to one another; and the audio feature of the speech paired with the target image is similar to the audio feature of the speech paired with the similar image, wherein the updating updates the parameter such that a loss function is minimized, the loss function including a term that becomes smaller with an increase in a degree of similarity between features of the data in the pair included in the first dataset.

4. The learning method according to claim 3, wherein: the loss function further includes a term that becomes smaller with an increase in a degree of similarity between the features of the data in the pair included in the second dataset; and a term that becomes smaller with an increase in a degree of similarity between the feature of the data paired with the target image and the feature of the data paired with the similar data, and that is capable of setting a weight as a hyperparameter.

5. A non-transitory computer-readable recording medium having stored therein a program, for learning, that causes a computer to execute a process, comprising:

firstly calculating an image feature, which is a feature of each image, included in a first dataset that is a dataset of a pair of an image and a speech in a first language, and a second dataset that is a dataset of a pair of an image and a speech in a second language, using a model that receives an image and outputs a feature obtained by mapping the image into an embedding space;

secondly calculating an audio feature, which is a feature of each speech, included in the first dataset and the second dataset, using a model that receives speech and outputs a feature obtained by mapping the speech into the embedding space;

calculating an image similarity matrix of the image of the first dataset with respect to the image of the second dataset;

selecting a similar image similar to each target image that is an image in the first dataset, from an image included in the second dataset based on the image similarity matrix; and updating a parameter of each model used by the firstly calculating and the secondly calculating such that the image feature of the image included in the first dataset and the second dataset, and the audio feature of the speech paired with the image are similar to one another; and the audio feature of the speech paired with the target image is similar to the audio feature of the speech paired with the similar image, wherein the updating updates the parameter such that a loss function is minimized, the loss function including a term that becomes smaller with an increase in a degree of similarity between features of the data in the pair included in the first dataset.

6. The non-transitory computer readable medium according to claim 5, wherein: the loss function further includes a term that becomes smaller with an increase in a degree of similarity between the features of the data in the pair included in the second dataset; and a term that becomes smaller with an increase in a degree of similarity between the feature of the data paired with the target image and the feature of the data paired with the similar data, and that is capable of setting a weight as a hyperparameter.

* * * * *